United States Patent Office 2,818,922
Patented Jan. 7, 1958

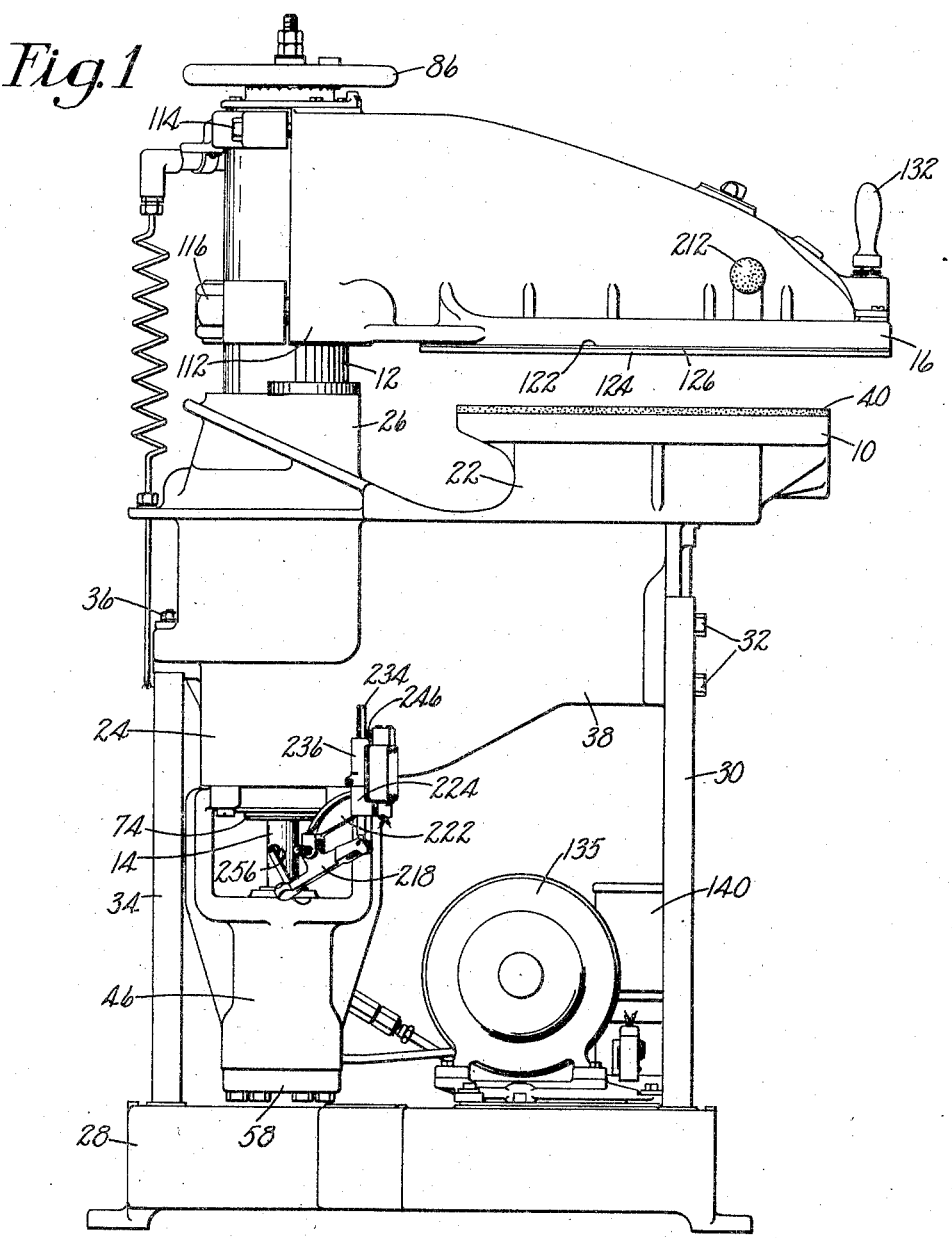

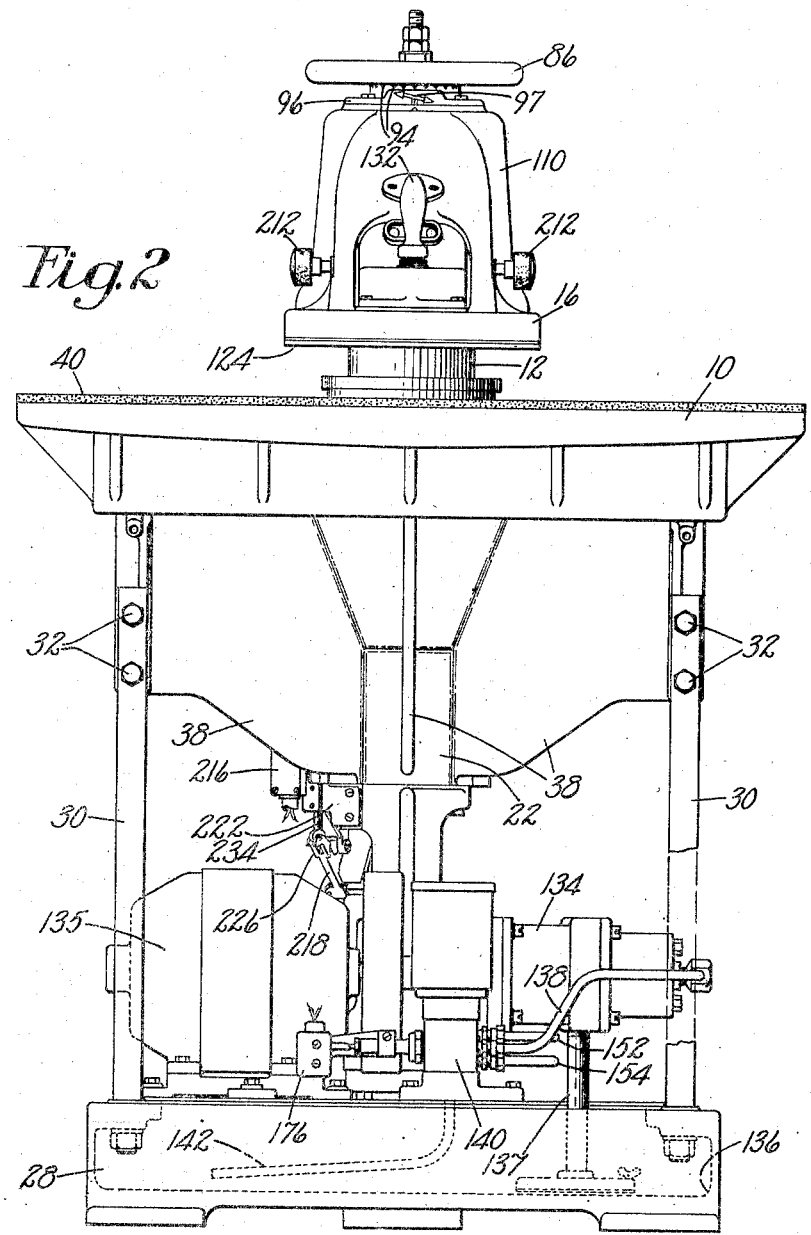

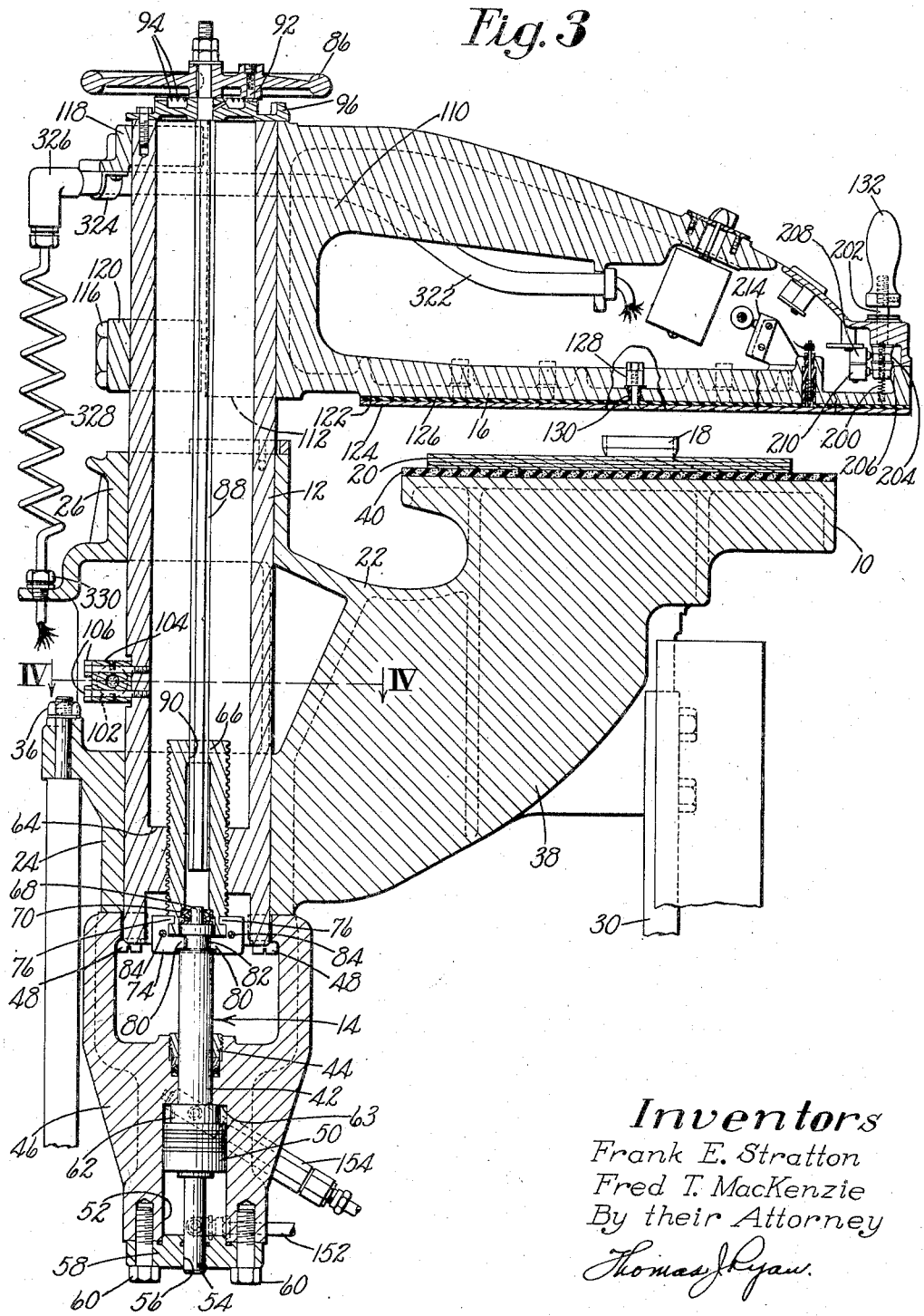

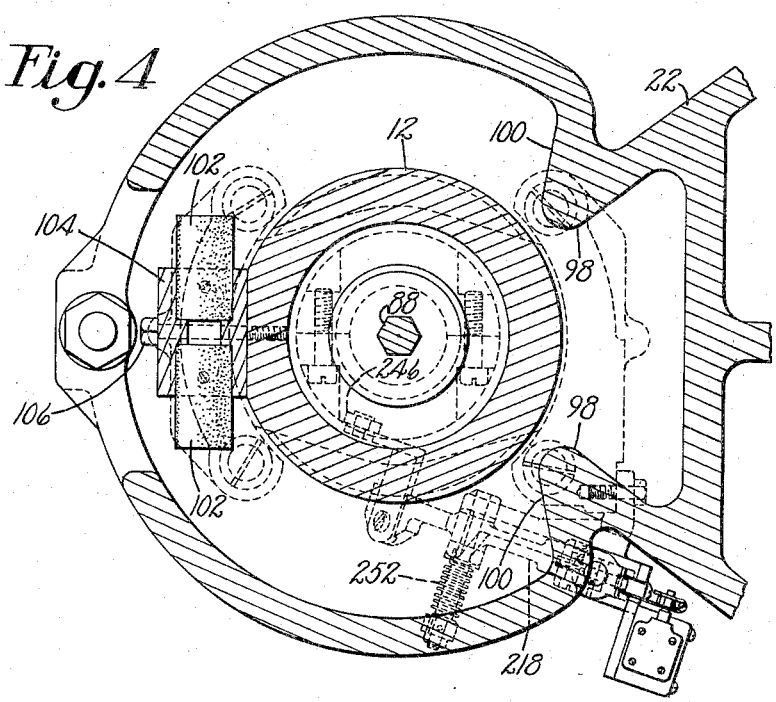
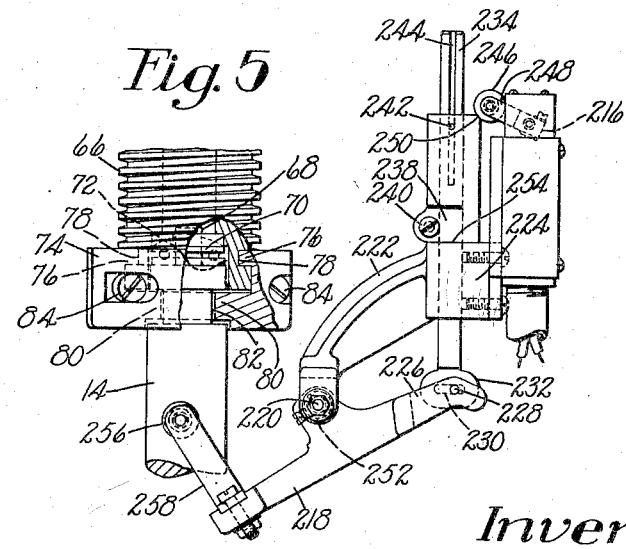

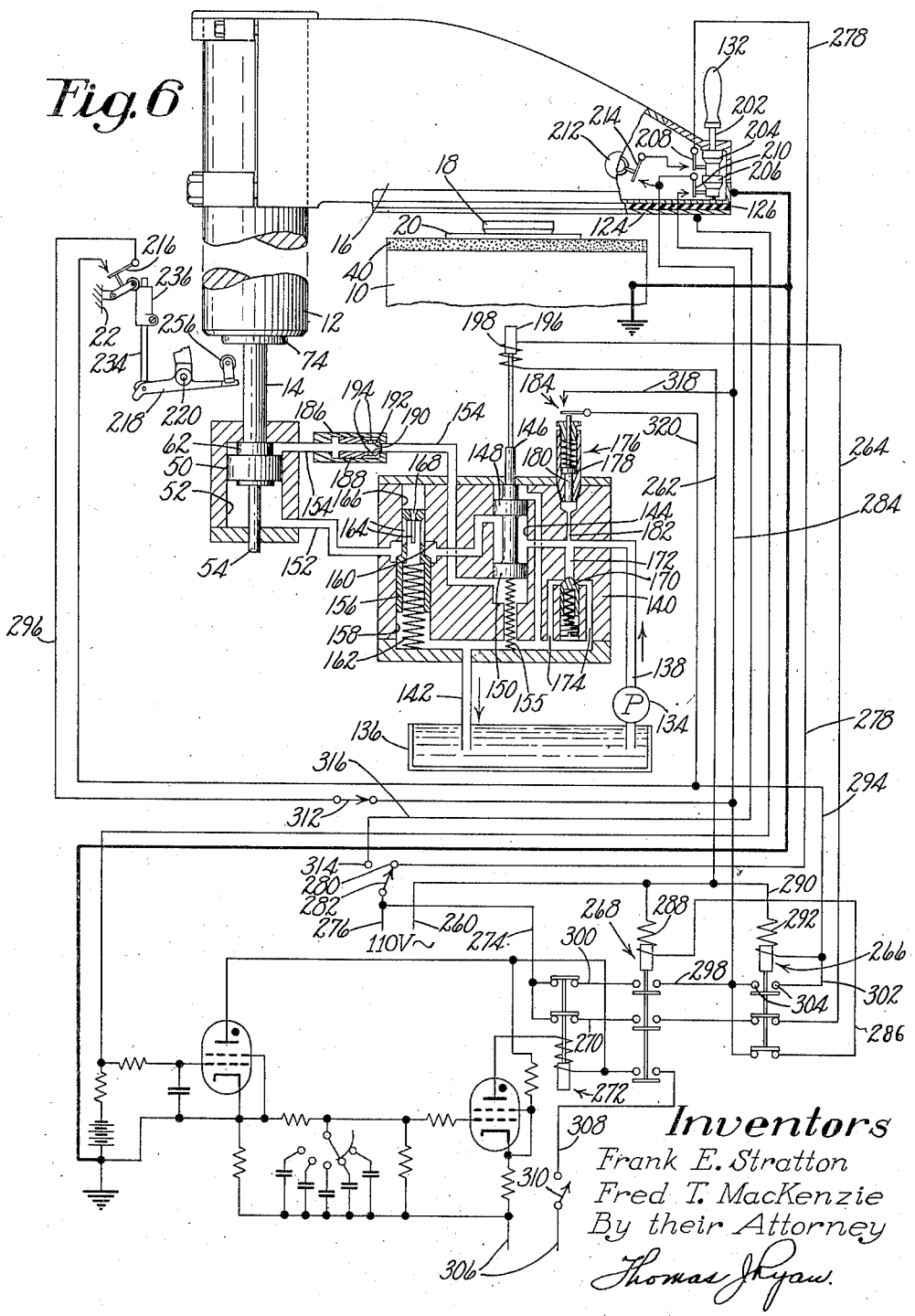

2,818,922
CUTTING PRESSES

Frank E. Stratton and Fred T. MacKenzie, Beverly, Mass., assignors to United Shoe Machinery Corporation, Flemington, N. J., a corporation of New Jersey Application February 11, 1955, Serial No. 487,634

3 Claims. (Cl. 164—23)

This invention relates to cutting presses, and more particularly, to control mechanism for presses of the type employing dies for cutting blanks from sheet materials such as leather or fabric.

For many years, particularly in the shoemaking industry, use has been made of presses comprising a platen or beam and a work support or cutting block, with power means for moving the platen toward the work support to force a freely movable cutting die through sheet material positioned upon the support thereby to form a blank.

In some types of presses the movement between the platen and work support has been accomplished by mechanical means comprising a power driven flywheel operatively connected to an eccentric for reciprocating a spindle carrying the platen.

More recently, the platen, in some machines, has been operated by hydraulic means. An example of such machine is disclosed in copending application Serial No. 409,670, filed February 11, 1954, in the names of Seabury and Bradley, which, in addition, discloses electrically operated mechanism for controlling the stroke of the platen in response to the engagement of a die with the work support.

In another copending application, Serial No. 481,683, filed January 13, 1955, in the names of Ericson and Stratton (now Patent No. 2,783,838, granted March 5, 1957), is disclosed an improved safety mechanism for machines of the type referred to, in which the electronically-operated mechanism is constructed and arranged to eliminate likelihood of injury to the operator.

In a third copending application, Serial No. 487,553, filed February 11, 1955, in the name of Bradley, there is disclosed an improved electronic circuit for controlling the stroke of the platen.

The present case discloses but does not claim subject matter in part common to each of the aforementioned applications, and in addition discloses further improved control mechanism for machines of the same type.

An object of the present invention is to provide improved mechanism for controlling machines of the type referred to by which such machines are particularly adapted to operate effectively upon various types of sheet material with a minimum of effort required by the operator and in an economical manner.

To this end, and as illustrated, the invention provides a work support upon which can be positioned sheet material to be operated upon and a die for cutting blanks from the material, a platen mounted upon a post for reciprocation toward and away from the work support and for movement manually laterally across the support, and power means for moving the platen toward and away from the work support, together with a trip device for reversing the direction of movement of the platen at a selectively predetermined point in its cycle of operation.

One feature of the invention consists in the provision of means for limiting the extent of lateral movement of the platen relatively to the work support thereby to retain the platen in positions readily accessible to the operator. To this end, the post is mounted in a hollow portion of the machine frame, and has buffer members located within the hollow portion and adapted to engage reentrant portions of the frame which form stops for arresting lateral movement of the post and platen. This construction provides for the safety of the operator in that the buffers and stops are enclosed thus avoiding any likelihood of injury to the fingers of the operator.

Another feature of the invention provides for the adjustment of the platen relatively to the work support to accommodate dies of different heights. To this end, the post which carries the platen is mounted upon a screw threaded sleeve resting on the upper end of a supporting spindle, there being a hand wheel at the upper end of the post and having a depending portion of polygonal cross section slidably engaging a reduced portion of the sleeve having a polygonal cross section, for rotating the sleeve relatively to the post in effecting heightwise movement of the post and platen relatively to the spindle and work support.

These and other features of the invention are disclosed in the following specification and in the accompanying drawings, and are pointed out in the appended claims.

In the drawings,

Fig. 1 is a view in side elevation of a press constructed in accordance with one embodiment of the invention;

Fig. 2 is a view in front elevation of the machine;

Fig. 3 is a vertical cross sectoinal view of the upper portion of the machine;

Fig. 4 is a view in horizontal cross section taken along lines IV—IV of Fig. 3;

Fig. 5 is a view showing a portion of the spindle and trip mechanism; and

Fig. 6 is a diagrammatic view partly in section, showing details of the hydraulic control mechanism and a wiring diagram of the electrical control mechanism.

The machine herein illustrated is a press for cutting blanks from sheet material such as leather, metal, paper or fabrics. As shown in Figs. 1, 2 and 3, the machine comprises a work-supporting bed 10 and a post 12 mounted upon a vertically extending spindle 14 at one side of the bed, and a platen 16 carried by the post and movable manually about the axis of the spindle across the bed into operative position over a cutting die 18, Fig. 3, located upon sheet material 20 supported by the bed, power means hereinafter described being provided for reciprocating the spindle, post and platen in effecting a pressure applying operation of the platen upon the die to produce a blank from the material.

The bed 10 comprises a flat forwardly extending portion of a frame casting 22, the rearward portion of which is hollow and has two alined cylindrical collars 24 and 26 which constitute bearings for the post 12.

The casing 22 is supported above a hollow base 28, Figs. 1 and 2, by two legs 30 extending upwardly from the forward portion of the base 28 and secured to the casting by bolts 32, and by a third leg 34 secured to the casting by a nut 36. The casting 22 has reinforcing ribs 38 extending outwardly from the bearings. This arrangement of the casting and supporting members provides a sturdy construction which to a large extent serves to eliminate appreciable deflection between the bed and post during pressure applying operations thus contributing to smoothness of operation of the machine.

The work to be operated upon, sheet material 20, is directly supported by a pad 40 resting upon the upper surface of the bed 10. The pad is composed of any suitable cutting block material such as fiber, wood or rubber composition, and for certain operations of the machine a pad of electrically conductive rubber is utilized.

The spindle 14 which supports and actuates the post 12 comprises a shaft 42 mounted in a bearing 44 in a bracket 46 secured by bolts 48 to the lower portion of the casting 22 near the bearing 24. The lower end of the spindle carries a piston 50 slidable in a cylinder 52 formed in the lower portion of the bracket 46, the piston having a reduced portion 54 closely fitting and extending through a bore 56 in a cap 58, secured to the bracket 46 by bolts 60, and forming a closure for the cylinder.

Above the upper end of the piston the spindle has a flange 62 smaller in diameter than that of the cylinder 52. The flange acts as a stop upon engagement of the upper end wall 63 of the cylinder when fluid under pressure is admitted to the lower end portion of the cylinder as hereinafter described to force the spindle and its associated parts upwardly.

Means are provided for supporting the post 12 upon the spindle 14 in such manner that the post and the platen 16 secured to it can readily be rotated about the axis of the spindle.

To this end, the post is provided near its lower extremity with an inturned flange 64 threaded upon a hollow sleeve 66 which surrounds the upper end of the spindle 14. The spindle has a projection 68 around which is positioned a ball thrust bearing 70 received in a recessed portion 72 of the sleeve, the entire weight of the post and sleeve being borne by the bearing.

In order to connect the sleeve and spindle for heightwise movement together there is provided a split collar 74, Figs. 3 and 5, having flanges 76 engaging a recess 78 in the sleeve and flanges 80 engaging a recess 82 in the spindle, the parts of the split collar being clamped in position by bolts 84. It is to be noted that there is clearance between the flanges 80 and the inner walls of the recess 82 in which they are positioned with the result that rotation of the sleeve does not tend to rotate the spindle. The above construction thus contributes to the ease of swinging movement of the platen and post about the axis of the spindle.

Mechanism is provided for adjusting the position of the platen 16 relatively to the cutting bed in order to provide for operation upon dies of different heights.

This is accomplished by means of a hand wheel 86 located at the top of the post 12 and carrying a hexagonal rod 88 extending down through the post and through a hexagonal opening 90 in the upper end of the sleeve 66. Rotation of the hand wheel thus causes rotation of the sleeve relatively to the post when the platen 16 and post are held stationary and results in the raising or lowering of the platen heightwise of the bed 10. The setting of the platen is locked by means of a spring-pressed detent 92 carried by the hand wheel and arranged to engage one or another of a series of notches 94 in a plate 96 positioned upon the top of the the post. The direction in which the hand wheel is to be turned to raise or lower the platen is indicated by an inclined arrow 97, Fig. 2, on the plate 96.

Mechanism is provided for arresting movement of the platen 16 laterally across the bed 10 with the limits of its range of movement of about 114°.

To this end the interior of the casting 22, Figs. 3 and 4, is provided with oppositely arranged reentrant portions 98 providing stops 100 adapted to engage rubber buffers 102 located in a boss 104 secured by screws 106 to the post 12.

It is to be noted that both stops and buffers are entirely enclosed by the casting so that there is no possibility of the operator's fingers being caught between a stop and a buffer when the platen is swung to its extreme limit.

The platen 16 is in the form of a cantilever beam and comprises a hollow casting 110 having at its inner end a U-shaped portion 112 arranged partially to embrace the post 12, and is secured to the post by screw bolts 114 and 116 extending respectively through U-shaped straps 118 and 120. The bottom surface 122 of the platen extends outwardly from the post 12 horizontally, and has secured to it a replaceable striking plate 124 which is insulated from the body portion of the platen by a layer 126 of insulating material. The striking plate and insulating layer are secured to the platen by screw bolts 128 extending through dogs 130.

The platen has at its outer end a handle 132 by which the platen can readily be swung, manually, about the axis of the spindle, across the bed 10.

The spindle 14, post 12, and platen 16 are arranged to be reciprocated by means including mechanical, hydraulic, and electrical devices.

The power means for effecting movements of the spindle 14, comprises a pump 134 driven by an electric motor 135 for forcing fluid, such as oil, through a line 137 from a sump 136 in the hollow base 28 through a passage 138 to a valve casing 140 with an exhaust passage 142 leading back to the sump.

The casing 140 has a bore 144 within which is slidably positioned a valve element 146 having two spaced pistons 148 and 150 positioned upon opposite sides of the passage 138. From the central part of the bore 144 there is a passage 152 to the lower portion of the cylinder 52, and a passage 154 extending to the upper portion of the cylinder.

It is to be noted that the control valve element 146 is normally forced upwardly in the bore 144 by a spring 155, with the result that fluid under pressure flows from the pump through the passages 138 and 152, to maintain the piston 50 with its associated parts, the spindle 14, the post 12 and the platen 16 in uppermost position.

When the control valve element 146 is in its lowermost position brought about by means subsequently to be described, the fluid under pressure is led through the passage 154 to the upper portion of the cylinder 52 to effect downward movement of the spindle, post and platen.

In order to take care of excess pressure, caused by the pump, when the valve element is in its uppermost position, there is provided a low pressure relief mechanism. This mechanism comprises a hollow sleeve 156 positioned in a bore 158 in the casing 140 and intersecting the passage 152. The sleeve has a reduced portion extending through a chamber 160, and is normally forced upwardly by a spring 162. The upper portion of the sleeve has slots 164 extending into the interior of the sleeve, and normally positioned in a reduced portion 166 of the bore 158. The sleeve has a relief opening 168 in its upper end. The purpose of this mechanism is to provide a pressure relief in the event the pump pressure becomes excessive when the platen is in its uppermost position. Thus, when more than sufficient pressure is supplied by the pump, when the platen is elevated, the pressure will operate to force the sleeve 156 downwardly against the pressure of the spring 162 to permit fluid to flow through the slots 164 down through the sleeve and back to the sump 136.

There is provided a high pressure relief operative when pressure has been built up to a predetermined point during the operation of forcing the spindle, post and beam downwardly. This comprises a spring pressed needle valve 170 positioned normally to close off a by-pass 172 from passage 138 in the casing 140. When the pump pressure becomes excessive the valve 170 opens permitting flow of fluid through passages 174 to the exhaust passage 142 to the sump.

As a further safety measure, there is provided a high pressure relief valve 176, operable through electrical means hereinafter described, to arrest and reverse downward movement of the platen. This valve comprises a spring-pressed piston 178 mounted in a plug 180 on the valve casing 140 and extending into a branch 182 of the passage 138. If the pressure of the pump 134 should build up to a peak point where the platen is forced downwardly the piston is forced upwardly to trip a switch 184 operatively effective to move the valve element 146 in a direction to arrest downward movement of the platen.

We have provided means for reducing vibration which might be otherwise caused at the upper end of the stroke of the platen 16. The device for doing this comprises a valve in the high pressure supply line 154 leading to the upper portion of the cylinder 52. Accordingly, there is a casing 186 surrounding the line 154 just before it enters the cylinder 52, and having therein a slidable sleeve 188 terminating in a nozzle 190 adapted to seat in a constricted portion 192 of the casing. The sleeve is provided with openings 194 which when the sleeve is moved to the left under pressure of pump 134 in Fig. 6, will permit abundant flow of fluid to the upper end of the cylinder 52, but when pressure is applied to the lower portion of the cylinder, the exhaust through the nozzle is slowed down, with the result that the movement of the platen to its uppermost position will be cushioned.

Movement of the valve element 146 upwardly is controlled by a solenoid 196, the coil 198 of which is arranged to be energized upon actuation of manually operated means including the handle 132.

This handle 132 is mounted upon the outer end of the platen 16 for vertical movement relatively thereto, being normally pressed upwardly by a spring 200, Fig. 3. The handle has a downwardly projecting spindle 202 slidably mounted in the outer portion of the platen 16 and carries two frusto-conical members 204 and 206, Fig. 6, arranged, respectively, to engage and close two switches 208 and 210 when the handle is depressed.

The present construction as herein claimed is only concerned with the upper switch 208, the other switch 210 being part of an alternative arrangement of the present mechanism. Use is made of a two hand safety control by which the operator is required to depress the handle 132 with one hand and to press one or the other of the buttons 212 to close a switch 214 in order to initiate operation of the starting means. For a more complete description of the mechanism employed in the two hand starting control, reference may be had to United States Letters Patent No. 2,651,365, granted September 8, 1953, upon application filed in the names of Stratton et al.

Means is provided for arresting movement of the platen 16 toward the work support, or bed 10, when the platen has moved a predetermined distance toward the bed. This is accomplished by means for tripping a switch 216 which in turn sets in motion means for deenergizing the solenoid 196 thus to permit the reverse movement of the spindle upon reverse movement of the valve element 146.

To this end we provide a switch closing means responsive to downward movement of the post 12. This means comprises a rocking lever 218, Fig. 5, pivoted on a stud 220 in a depending arm 222 of a bracket 224 on the casting 22. The lever has a bifurcated end portion 226 carrying a pin 228 extending through a slot 230 in an enlarged portion 232 at the lower end of a rod 234 slidably mounted for vertical movements in the bracket 222. The rod carries a sleeve 236 which can be secured to the rod in various positions heightwise thereof by means of a split collar 238 and a screw bolt 240. Rotation of the sleeve relatively to the rod during adjustment of the sleeve along the rod is prevented by a pin 242 carried by the sleeve and projecting into a groove 244 in the rod.

The sleeve 236 is movable, with the rod 234, heightwise of the bracket 224 toward and away from a roll 246 carried by a lever 248 connected to the switch 216. The sleeve has a curved upper end portion 250 arranged to engage the roll 246 and operative to rotate the arm 248 in a clockwise direction to close a circuit through the switch when the sleeve is raised.

The rocking lever 218 is normally urged in a clockwise direction, Fig. 5, about the stud 220 by means of a spring 252 on the stud thus normally urging the rod 234 downwardly with the sleeve 236 resting upon the upper surface 254 of the bracket 224 as shown in the figure. The circuit through the switch 216 is closed upon movement of the lever in a counterclockwise direction effected by engagement of the nut 74 on the spindle 14 with a roll 256 on an arm 258 carried at the outer end of the rocking lever 218.

The construction just described is such that the switch 216 can be operated at any predetermined time during the downward movement of the platen depending upon the adjusted position of the sleeve 236 on the rod 234.

In order to operate the solenoid 196 in initiating a power operation of the platen 16 there is provided an electric circuit extending from one side 260 of an A. C. power source through a lead 262 to the solenoid coil 198 and from the coil by a lead 264 through a normally closed auxiliary relay 266 to a normally open starting relay 268. The circuit then passes through a lead 270 to a normally closed relay 272 and thence through lead 274 to the other side 276 of the power source.

The starting relay 268 is controlled by a circuit, under control of the starting handle 132, and comprising a lead 278, extending from a contact 280 of a switch 282 connected to the power source 276, and extending to the switch 208, a return being provided from switch 214 by a lead 284 to the auxiliary relay 266 and by a lead 286 through a coil 288 of the starting relay 268 and thence to the side 260 of the power source. Thus when the starting handle is depressed and a button 212 is actuated closing the circuit through lead 278, switches 208 and 214 and lead 284, the coil 288 is actuated to close the circuit through the solenoid coil 198 resulting in upward movement of the valve element 146 and causing power movement of the platen 16 downwardly.

The platen continues its downward movement until the lever 218 is rocked into position to effect closing of the switch 216. When this occurs current flows from supply 260 through lead 290 to a coil 292 of the auxiliary solenoid 266 and a lead 294 to the switch 216 and from thence by a lead 296, lead 284, and a lead 300 to the power source 276. As a result of this the auxiliary relay is moved upwardly breaking the circuit through the coil 198, with the result that the solenoid is deenergized thus permitting spring 155 to move the valve element upwardly to effect a reversal of the movement of the platen. The auxiliary relay is held in its upper position by a branch circuit through lead 290, across lead 302, and contacts 304 of the relay, at least, until such time as the spindle rises sufficiently for the rocking lever to release the switch 216. In any event, the auxiliary relay will remain in its upper position, thus preventing any further initiation of downward movement of the platen until the circuit through coil 288 has been deenergized through release of handle 132 or one of the buttons 212.

It is to be noted that the drawings, particularly Fig. 6, disclose electronic devices, not claimed herein, for controlling movement of the platen which can be used alternatively to the control devices herein claimed.

In this connection it is to be noted that these devices are powered in part by a D. C. source 306 from which extends a lead 308 to the starting relay 268 and to the relay 272. The lead 308 has a switch 310 which when open renders the electronic circuit inoperative as such. However, it is to be noted that the relay 272 acts as a connection for leads 270 and 300 with the A. C. power source.

A switch 312 in the lead 296 when opened disconnects the trip mechanism control when it is desired to utilize the electronic controls.

The control by the push buttons 212 can be eliminated when desired by moving the switch 282 to a contact 314 in which case the current for activating the starting relay 268 passes through a lead 316, through switch 210, when the handle 132 is depressed, and through the coil 288 by the leads 284 and 286.

When the switch 184 is closed by the building up of excessive pressure in the pump supply line 138 the auxiliary relay is actuated by a circuit extending from one side of the switch 184 including a lead 318 and lead 284, and from the other side of the switch a lead 320, and leads 294 and 290.

Conveniently to facilitate connection of the switches in the movable platen with the power source of the various leads are enclosed by a conduit 322 extending to the rear of the platen, Fig. 3, and held by a clamp 324. Beyond the inner end 326 of the conduit the leads are enclosed in a flexible conduit 328 in the form of a coil extending between the end 326 and a plug 330 in the frame casting 22. In the operation of the machine, assuming the parts are in the positions shown in Fig. 6, and with the die 18 positioned on sheet material 20, depression of the handle 132 and pressure on a knob 212 closes switches 208 and 214 with the result that current passes through the solenoid coil 198 effecting downward movement of the valve element 146 connecting passage 152 with the exhaust 142 and opening passage 154 to the flow of fluid from the pump 134 to the upper end of the cylinder 52 thus causing downward movement of the piston 50 and a corresponding downward movement of the platen 16 to force the die 18 through the sheet material 20.

When the downward movement has progressed sufficiently, preferably when the die 18 has passed through the sheet material and lightly penetrated the pad 140, the lower portion of the collar 74 engages the roll 256 rotating the lever 218 in a clockwise direction to cause the sleeve 236 to close the switch 216.

As a result of this, current flows through the coil 292 of the auxiliary relay 266 and the relay is raised to open the circuit through the solenoid, thus permitting the solenoid to deenergize, after which the spring 155 forces the valve element 146 upwardly to reverse the flow of the fluid from the pump. The flow now is forced through the passage 154 to the lower portion of the cylinder 52 forcing the piston 50 in an upward direction, thereby reversing the direction of movement of the spindle and platen. When the piston reaches its uppermost position it is maintained there by the pressure of the fluid from the pump.

As the piston rises the roll 256 is released, permitting the trip switch 216 to open with the result that the circuit through the coil 292 of the auxiliary relay is opened permitting the relay to return to its original position.

Having thus described our invention what we claim as new and desire to secure by Letters Patent of the United States is:

1. A cutting press comprising a work support, a spindle mounted at one side of the work support, a hollow post, means mounting the post on the spindle comprising a thrust bearing carried at the upper end of the spindle, and a screw threaded sleeve mounted in the lower end of the post and resting upon the bearing, a platen secured to the post and extending over the work support, and means for varying the height of the platen relatively to the support comprising a hand wheel at the upper end of the post, a reduced portion at the upper end of the sleeve having therein an opening of polygonal cross section, and a rod secured to the hand wheel and having a depending portion of polygonal cross section extending through the reduced portion of the sleeve for sliding movement longitudinally thereof, whereby upon rotation of the hand wheel the sleeve is rotated relatively to the post to effect movement of the platen heightwise of the support.

2. A cutting press comprising a frame casting having at its forward end a horizontally extending work support, and at its rear end a hollow portion, a post slidably mounted in the hollow portion of the frame casting, a platen secured to the post for angular movement about the axis of the post across the work support, and means for limiting lateral angular movement of the platen located within the frame casting and comprising reentrant portions of the frame casting positioned on opposite sides of the post and forming stops, and buffer members carried by the post within the hollow portion for engaging the stops.

3. A cutting press comprising a frame having at its forward end a horizontally extending work support and at its rear end a hollow portion, a vertically extending post slidably mounted in the hollow portion, a platen secured to one side of the post for movement about the axis of the post laterally across the work support, the hollow portion having reentrant portions, surfaces of which extend radially of the axis of the post, and a plurality of buffer members carried by the post within the hollow portion on the side of the post opposite to the platen, each of the buffer members being constructed and arranged to engage one of the surfaces of the reentrant portions of the frame to limit the extent of lateral movement of the platen.

References Cited in the file of this patent
UNITED STATES PATENTS

| | | |
|---|---|---|
| 921,503 | Bates | May 11, 1909 |
| 1,070,729 | Prime et al. | Aug. 19, 1913 |
| 1,075,064 | Prime | Oct. 7, 1913 |
| 1,442,180 | Sherman | Jan. 16, 1923 |
| 1,574,187 | Crickmer | Feb. 23, 1926 |
| 1,657,059 | Ballard | Jan. 24, 1928 |
| 2,105,215 | Dinzl | Jan. 11, 1938 |
| 2,121,716 | Shields | June 21, 1938 |
| 2,283,168 | Ernst et al. | May 19, 1942 |
| 2,612,951 | Palmleaf | Oct. 7, 1952 |